United States Patent
Rich et al.

(10) Patent No.: US 6,467,815 B1
(45) Date of Patent: Oct. 22, 2002

(54) FITTING FOR INSTALLATION OF A NIPPLE FROM THE EXTERIOR OF A DUCT AND METHOD OF INSTALLATION

(75) Inventors: Joseph M Rich, Jericho, VT (US); Jeffery A. Goodwin, Jericho, VT (US); Douglas L. Allen, S. Burlington, VT (US)

(73) Assignee: Fab-Tech Incorporated, Colchester, VT (US)

( * ) Notice: Subject to any disclaimer, the term of this patent is extended or adjusted under 35 U.S.C. 154(b) by 0 days.

(21) Appl. No.: 09/716,117

(22) Filed: Nov. 17, 2000

(51) Int. Cl.[7] ................................................ F16L 41/00
(52) U.S. Cl. .................. 285/208; 285/139.1; 285/3; 285/423
(58) Field of Search ....................... 285/139.1, 423, 285/FOR 143, 208, 38, 39, 3, 4

(56) References Cited

U.S. PATENT DOCUMENTS

| | | | |
|---|---|---|---|
| 1,334,072 A | | 3/1920 | Bennett |
| 1,530,099 A | | 3/1925 | Youngman |
| 1,542,645 A | | 6/1925 | Saucke |
| 1,755,104 A | * | 4/1930 | Deierlein ................ 285/208 |
| 2,398,041 A | | 4/1946 | Russell |
| 2,449,869 A | | 9/1948 | Watson |
| 2,985,291 A | * | 5/1961 | Schoepe et al. ........... 277/650 |
| 3,181,899 A | * | 5/1965 | McKnight, Jr. ............. 82/11 |
| 3,480,299 A | * | 11/1969 | Henderson ................ 285/4 |
| 5,931,200 A | * | 8/1999 | Mulvey et al. ............ 138/109 |

* cited by examiner

Primary Examiner—Lynne H. Browne
Assistant Examiner—Giovanna Collins
(74) Attorney, Agent, or Firm—William C. Crutcher

(57) ABSTRACT

A special fitting for installing a flanged nipple from the exterior of a duct. The threaded nipple has a handling stem formed integrally therewith, which is used to hold the nipple and flange inside the duct while a flexible cup seal washer is deformed and passed through the space between the handling stem and the duct. Thereafter, the fitting is drawn up with a nut and the handling stem cut off to provide a nipple.

3 Claims, 2 Drawing Sheets

Figure 1:
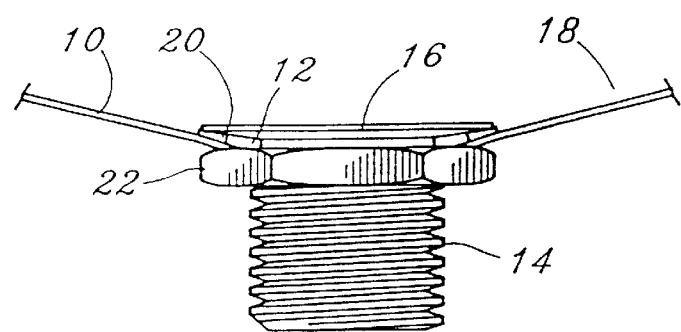

FITTING FOR INSTALLATION OF A NIPPLE FROM THE EXTERIOR OF A DUCT AND METHOD OF INSTALLATION

This invention relates generally to duct fittings, and more particularly to a fitting for installation of a nipple from the exterior of a duct, and method of installing same.

Industries of all types use ducting to conduct gaseous fluids. These include process piping systems and fume exhaust systems for various industries including the semiconductor, pharmaceutical, pulpit paper, metals mining, chemical processing, petrochemical and hazardous waste disposal industries. For conducting corrosive fumes and chemically active gases, stainless steel duct and pipe coated with chemically resistant material such as Teflon is often used.

Occasionally, it is desirable to install a nipple into the duct after the duct system is already connected and in place, for the purpose of extracting samples or inserting sensors into the fluid passing through the duct. This poses a formidable problem, since the fitting cannot be welded without destroying the integrity of the duct internal coating. In the past, it has been necessary to either crawl into the duct to insert a flanged nipple with sealing gasket from the inside through a hole in the duct, or to resort to various special fittings and methods to install the nipple from the outside of the duct.

A number of authors have suggested schemes for installing a nipple from the exterior of a duct, these being listed below as follows, which list is not all-inclusive.

| Pat. No. | Inventor | Issue Date | Title |
|---|---|---|---|
| 244,869 | Watson | 9/21/48 | Connector |
| 2,398,041 | Russell | 4/9/46 | Fitting |
| 1,542,645 | Saucke | 6/16/25 | Pipe Fitting |
| 1,530,099 | Youngman | 3/17/25 | Tank Coupling |
| 1,334,072 | Bennett | 3/16/20 | Boiler Connection |

It would be desirable to have a simple fitting for installation of a nipple from the exterior of a duct which is comprised of simple parts and which can be installed from the outside of the duct. It would also be desirable to provide an externally installable nipple, which is compatible with a stainless steel duct coated internally with a protective layer of Teflon.

Accordingly, one object of the present invention is to provide an improved fitting for installation of a nipple from the exterior of a duct.

Another object of the invention is to provide an improved method for installation of such a nipple through a round hole in the duct.

SUMMARY OF THE INVENTION

Briefly stated, the invention comprises a fitting for installation of a nipple from the exterior of a duct having a wall with an aperture therein for receiving a nipple comprising a nipple installation member having a hollow externally threaded nipple portion, a flange disposed on one end thereof and dimensioned so as to pass through the aperture, and an elongated handling stem extending from the other end of the nipple portion; a flexible cup seal washer having an outer dimension greater than that of the aperture and adapted to cooperate with the flange to seal the nipple portion in the aperture, the washer being sufficiently flexible and so dimensioned to enable passage over the elongated handling stem and through the aperture; and a nut with threads matching the externally threaded nipple portion, whereby the nipple portion may be installed from the exterior of the duct and the elongated handling stem then removed to provide a nipple sealed in the duct wall.

In its preferred form the nipple portion, flange and elongated handling stem comprise a single plastic member, wherein the elongated handling stem is a solid extension integral with the nipple portion and closing off one end of the nipple portion. The method includes the steps of inserting the flange and nipple portion through the aperture while holding the nipple installation member by the elongated handling stem from outside the duct, passing the flexible sealing washer around the stem and through the aperture, tightening the nut around the nipple portion to compress the washer between the duct wall and the flange to seal the nipple portion in the aperture, and removing the elongated stem member to provide a nipple in the duct wall.

DRAWING

Figure 2:
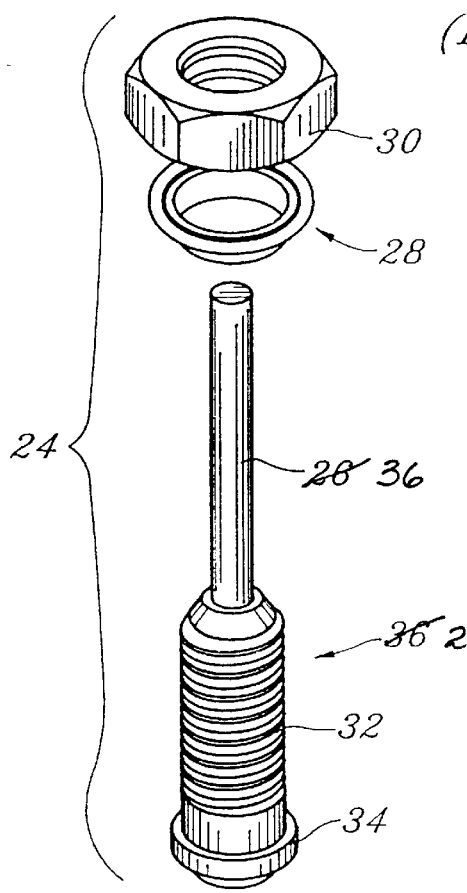
Figure 3:
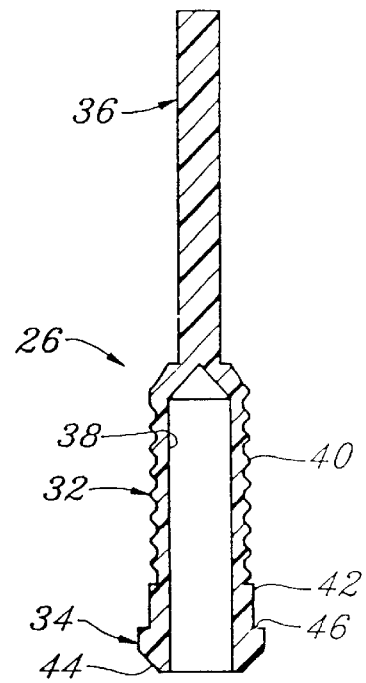
Figure 4:
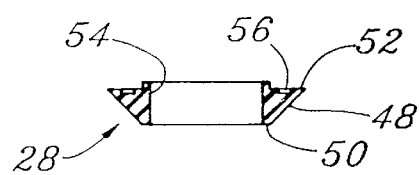

The invention will be better understood by reference to the following description, taken in connection with the accompanying drawing, in which:

FIG. 1 is a drawing of a prior art nipple suitable for installation from the interior of a duct, FIG. 2 is an exploded perspective view of a fitting according to the present invention, showing the major components making up the fitting, FIG. 3 is an elevational view, taken in cross-section through the centerline of a nipple installation member, FIG. 4 is an elevational view, taken in cross-section through the center line of a cup seal washer, and FIGS. 5 through 8 are elevation drawings illustrating the method of installation.

DESCRIPTION OF THE PREFERRED EMBODIMENT

Referring to FIG. 1 of the drawing, a prior art nipple is shown installed from the interior of a section of duct, having a duct wall 10 with an aperture 12 therein. A nipple fitting comprising a threaded hollow nipple portion 14 and an integral flange 16 had to be inserted from the interior 18 of the duct. A seal was accomplished by compressing a die cut gasket 20 against the wall of the duct with a jam nut 22. The present invention does not require installation from inside of the duct 10.

Referring to FIG. 2 of the drawing, the invention comprises a fitting indicated by bracket 24 comprising three elements: a nipple installation member 26; a cup seal washer 28; and a conventional threaded nut 30. The nipple installation member 26 is made up of a hollow, externally threaded nipple portion 32, a flange 34 on one end thereof, and an elongated handling stem 36 extending from the other end. The nipple installation member 26 is preferably an integral plastic member resistant to corrosion and compatible with the coating, if any, on the duct work. This plastic member may be molded, machined or built up from components joined by suitable techniques. A preferred material is Teflon®. The cup seal washer 28 is made of flexible elastomeric material, preferably Viton®. Teflon and Viton are registered trademarks of E.I. Du Pont de Nemours and Company.

Referring to FIG. 3 of the drawing, an enlarged cross-sectional view of the nipple installation member 26 details the aforesaid nipple portion 32, flange 34 and elongated handling stem 36 in cross-section. Nipple portion 32 has a cylindrical bore 38 and external threads 40 joined by a smooth gasket sealing surface 42. Flange 34 has a diameter selected to just pass through a circular aperture of a selected diameter which is cut in the wall of the duct from outside the duct. The flange 34 includes a beveled surface 44 to facilitate insertion of the member into the aperture in the duct and a radial sealing surface 46 for receiving the base of the cup seal washer.

The elongated handling stem 36 is of a lesser diameter than the nipple portion 32, solid and of sufficient length to firmly hold the nipple portion inside the duct while the cup washer is being inserted through the aperture in the duct in a manner to be described.

Referring to FIG. 4 of the drawing, a cross section through the flexible cup seal washer 28 shows that it has a beveled periphery 48 tapering from a smaller diameter sealing surface 50 to a greater diameter sealing surface 52. Sealing surface 50 is dimensioned to rest on the flange radial surface 46 (FIG. 3), and the inner diameter of the cup seal washer indicated at 54 fits closely about the smooth cylindrical surface 42 on the nipple portion (FIG. 3).

The upper sealing surface 52 is selected to be of a greater dimension than the diameter of the aperture in the duct work. A circular recess 56 provides additional flexibility for deforming the cup seal washer to pass through the aperture in the duct work, and sealing the interior of the duct.

Figure 5:
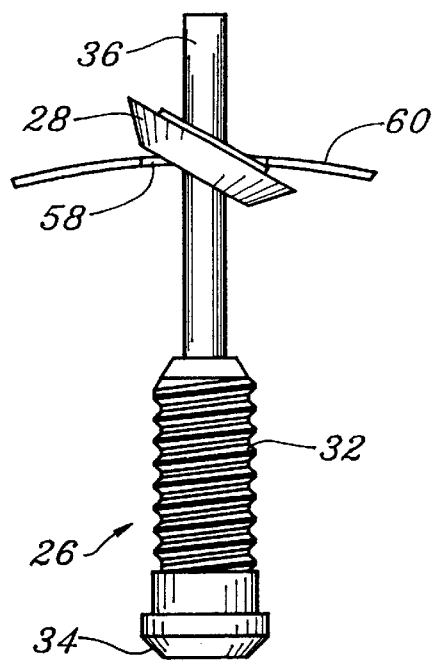

Referring now to FIGS. 5–8 of the drawing, the method of installing a nipple from the exterior of a duct may be clearly followed through the successive steps shown in the drawings. First, a circular aperture 58 is cut into duct 60 from the outside. The nipple installation member 26 is inserted through aperture 58 by holding the elongated handling stem 36 and inserting the flange 34 and nipple portion 32 through the aperture. Next, the cup seal washer is threaded over the stem 36 and deformed to pass it through the aperture in the space between the stem 36 and the edge of the aperture, as seen in FIG. 5.

Figure 6:
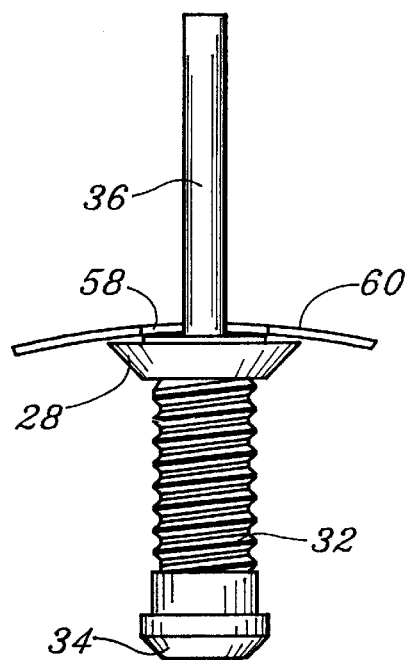

Referring to FIG. 6, the assembly is located and centered, so that the outer edges of washer 28 cover the aperture, in order to seal the nipple with the sealing surface 52.

Figure 7:
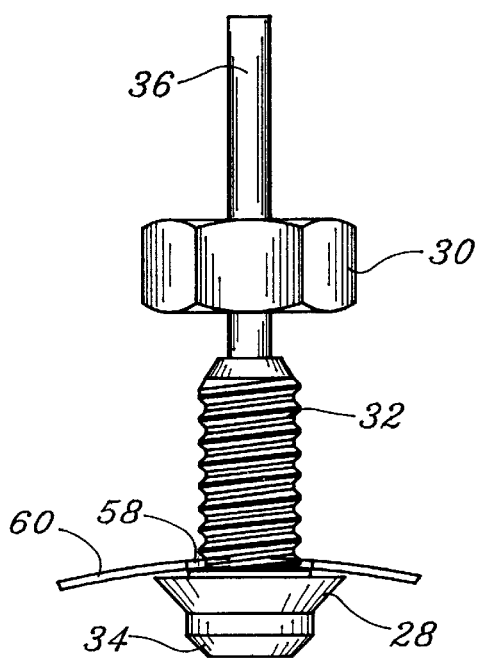

In FIG. 7, the assembly is shown partially withdrawn from the aperture, until the flange 34 engages the lower surface of cup seal washer 28, seating the lower sealing surface 50 on the flange surface 46 of the installation member 26. The nut 30 is threaded over the stem 36 and screwed on to the externally threaded nipple portion 32. The nut is tightened to compress washer 28 to provide a seal.

Figure 8:
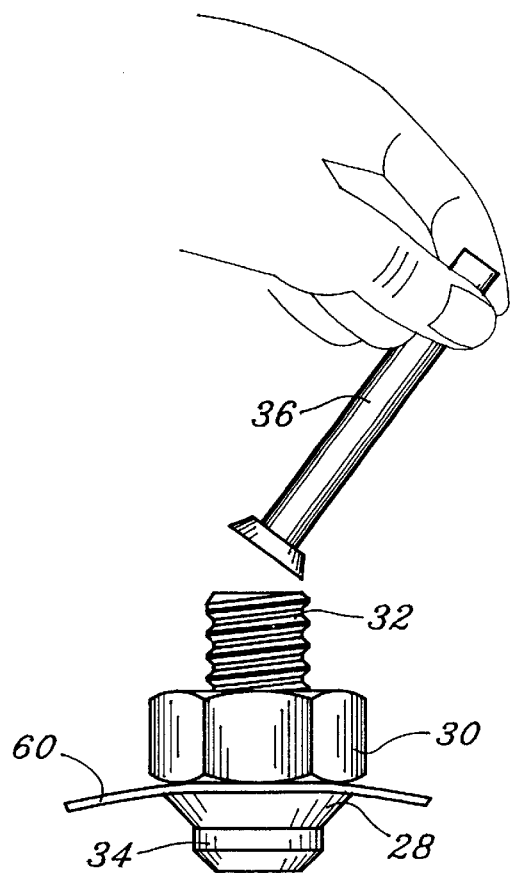

At this point, the fitting may be left in place until needed, since the stem 36 seals off the bore of the nipple portion 32. If the nipple is to be used immediately, the stem 36 and a small length of the nipple portion 32 are removed by severing, as shown in FIG. 8.

The foregoing invention provides a very simple fitting for installing a nipple from the exterior of a duct. It is especially useful for coated stainless steel duct used in corrosive atmospheres, because the materials of the nipple are compatible with the duct coating and cause no damage to the duct coating during installation. It is also useful for fiberglass reinforced plastic ducts, which also need to have penetrations sealed from corrosives.

While there has been disclosed what is considered to be the preferred embodiment of the invention, other modifications will occur to those skilled in the art, and it is desired to secure in the appended claims all such modifications as fall within the true spirit and scope of the invention.

What is claimed is:

1. A fitting for installation of a nipple from the exterior of a duct to provide a seal from the interior of said duct, said duct having a wall with an aperture therein for receiving a nipple, said fitting comprising:

a nipple installation member comprising a hollow, externally threaded nipple portion, a flange disposed on one end thereof and dimensioned so as to pass through said aperture, and an elongated handling stem extending from the other end of the nipple portion, wherein said nipple portion, said flange and said elongated handling stem comprise a single plastic molding, a flexible cup seal washer having an outer dimension greater than that of the aperture and adapted to cooperate with the flange to seal the nipple portion in the aperture from the interior of said duct, said washer being sufficiently flexible and so dimensioned to enable passage over the elongated handling stem and through the aperture, and a nut with threads matching the externally threaded nipple portion, whereby the nipple portion may be installed from the exterior of the duct and the elongated handling stem removed to provide a sealed nipple.

2. The fitting according to claim 1, wherein said flexible cup seal washer comprises an elastomeric washer with beveled periphery and having a first sealing surface dimensioned to close the aperture and a second sealing surface dimensioned to cooperate with the flange to seal the nipple portion when the nut is tightened, said second sealing surface defining a recess therein to provide additional flexibility for deforming the washer during installation, and improved sealing after installation.

3. The fitting according to claim 1, wherein the nipple portion is a hollow cylindrical member and wherein the elongated handling stem is a solid extension integral with the nipple portion and closing off one end of the nipple portion.

* * * * *